(12) United States Patent
Guan et al.

(10) Patent No.: US 8,713,435 B2
(45) Date of Patent: Apr. 29, 2014

(54) DYNAMIC REBASING OF PERSISTED TIME INFORMATION

(75) Inventors: Hongchao Guan, Redmond, WA (US); Jason Buckingham, Redmond, WA (US); Alessio Roic, Seattle, WA (US); Matthias Leibmann, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 335 days.

(21) Appl. No.: 12/868,921

(22) Filed: Aug. 26, 2010

(65) Prior Publication Data
US 2012/0054623 A1 Mar. 1, 2012

(51) Int. Cl.
*G06F 3/00* (2006.01)

(52) U.S. Cl.
USPC ............ 715/703; 715/700; 715/963; 708/112

(58) Field of Classification Search
USPC ................. 715/700, 703, 733, 764, 765, 963; 708/111, 112
See application file for complete search history.

(56) References Cited

U.S. PATENT DOCUMENTS

| | | | |
|---|---|---|---|
| 7,039,596 B1* | 5/2006 | Lu ................................. | 705/7.13 |
| 7,385,876 B2 | 6/2008 | Ihara et al. ....................... | 368/21 |
| 2002/0136094 A1 | 9/2002 | Kawai ............................. | 368/47 |
| 2003/0131073 A1* | 7/2003 | Lucovsky et al. ............. | 709/219 |
| 2006/0171257 A1 | 8/2006 | Cormier et al. ................. | 368/47 |
| 2006/0239123 A1 | 10/2006 | Chen ................................. | 368/21 |
| 2008/0122691 A1* | 5/2008 | Carani et al. ............. | 342/357.07 |
| 2008/0148267 A1* | 6/2008 | Jun et al. ....................... | 718/102 |
| 2008/0162234 A1* | 7/2008 | Lu et al. ............................. | 705/8 |
| 2009/0164283 A1* | 6/2009 | Coley ................................. | 705/7 |
| 2009/0193048 A1 | 7/2009 | Nalla et al. ............................. | 1/1 |
| 2009/0249222 A1* | 10/2009 | Schmidt et al. ............... | 715/751 |
| 2010/0075648 A1* | 3/2010 | Matsuoka et al. ............ | 455/418 |
| 2010/0228186 A1* | 9/2010 | Estes et al. ....................... | 604/66 |
| 2012/0054623 A1 | 3/2012 | Guan et al. | |

FOREIGN PATENT DOCUMENTS

CN 102509211 A 6/2012

OTHER PUBLICATIONS diTii.com; "Exchange Calendar Update Configuration Tool V 2.0: Utilizing Time Zone Data Update Tool for Microsoft Office Outlook V3.0 functionality"; Pub. Aug. 16, 2008; accessed May 31, 2010 at http://www.ditii.com/2008/08/16/exchange-calendar-update-configuration-tool-v-20-utilizing-time-zone-data-update-tool-for-microsoft-office-outlook-v30-functionality/.
Exchangepedia.com; "DST 2007: Understanding what needs to be done and how to do it"; Pub. Feb. 28, 2007; accessed May 31, 2010 at https://exchangepedia.com/blog/2007/02/dst-2007-understanding-what-needs-to-be.html.
MSDN; "Dynamic_Time_Zone_Information Structure"; Retrieved Date: May 28, 2010 at http://msdn.microsoft.com/en-us/library/ms724253(VS.85).aspx.

* cited by examiner

*Primary Examiner* — Xiomar L Bautista
(74) *Attorney, Agent, or Firm* — Louise Bowman; Jim Ross; Micky Minhas

(57) ABSTRACT

Dynamic time rebasing may be provided. After receiving a request to view a calendar item, a base time associated with the calendar item may be retrieved. A local bias associated with the request to view the calendar item may be identified. The base time may be converted to a local time according to the local bias. The calendar item may then be displayed according to the converted local time.

14 Claims, 4 Drawing Sheets

DYNAMIC REBASING OF PERSISTED TIME INFORMATION

BACKGROUND

Dynamic rebasing of persisted time information is a process for calculating an intended local time. In some situations, static timezone persistence in calendar meeting items may require rebasing of the meeting items whenever there is a DST and/or time zone change. In conventional systems, rebasing requires that either the end user of a calendar client or the administrator of a server where calendar information is stored runs a process that adjusts all meeting items, or each meeting item individually, to correct the static timezone information to reflect the time differences of DST changes. This process has to be regularly repeated with every time zone that is used in a calendar system that goes through regular DST changes. This frequently repeated process often interrupts end user productivity and causes calendar incorrectness by showing meetings at the incorrect times for organizers and attendees, thus making them miss meetings and causing additional costs for maintenance and support of the calendar system.

SUMMARY

Dynamic rebasing of persisted time information may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Dynamic time rebasing may be provided. After receiving a request to view a calendar item, a base time associated with the calendar item may be retrieved. A local bias associated with the request to view the calendar item may be identified. The base time may be converted to a local time according to the local bias. The calendar item may then be displayed according to the converted local time.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
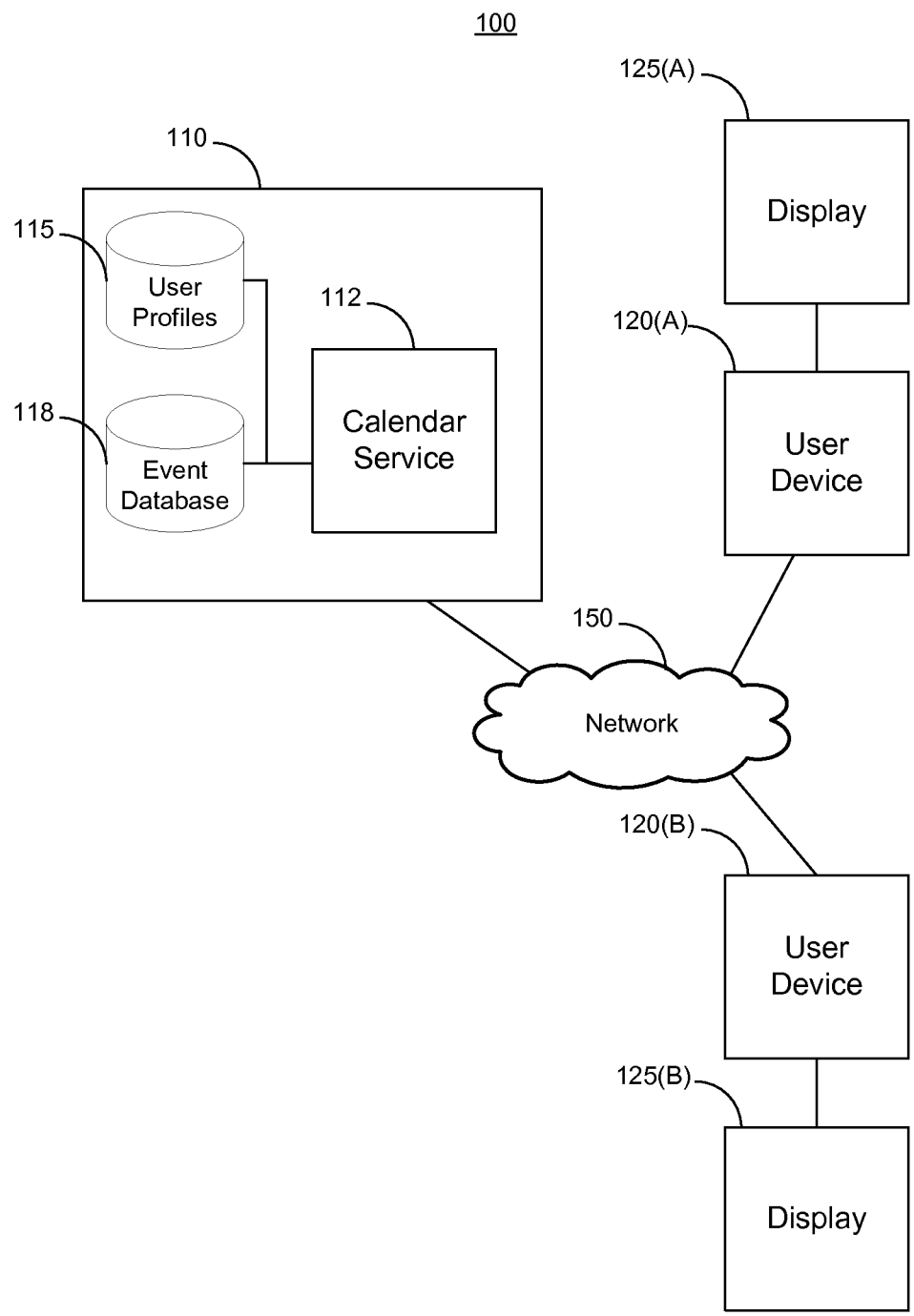
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Dynamic rebasing of persisted time information may be provided. Instead of storing and using statically stored timezone information to display a calendar item to the end user, consistent with embodiments of the present invention, the calendar system may dynamically calculate an intended local time based on the statically stored timezone information. Up-to-date timezone information available on a computer system may be used to apply this intended local time to the timezone information to display the meeting to the end user in the correct time. This calculation may be performed every time an end-user accesses the meeting. The result of this calculation may or may not be persisted in the calendar system. Thus, the user always gets the correct day and time of the meeting without the requirement of the user or administrator having to run any process to adjust meetings on timezone rule changes. Incorrect UTC time on a meeting may also get automatically updated when the user views the item.

Consistent with embodiments of the invention, persisted time information may be associated with other date and/or time based data items on a computer. For example, an enterprise may comprise installations and/or sites at numerous locations around the world. An administrator may want to run weekly full virus scans on all servers and desktops at 1 am at night, or a billing system may rely on providing statements to customers every Monday at 8 am. By dynamically rebasing the persisted time information, daylight savings time (DST) and/or time zone rule changes may not effect such processing happening at the same time.

FIG. 1 is a block diagram of an operating environment 100 comprising a server 110. Server 110 may comprise a calendar service 112 (e.g., an application and/or computer process operative to create, display, and/or manage calendar events), a user profile storage 115, and/or an event database 118. Operating environment 100 may further comprise a plurality of user devices 120(A)-(B) operatively connected to a plurality of respective display devices 125(A)-(B). User devices 120(A)-(B) may be communicatively coupled to each other and/or server 110 via a network 150, such as an Ethernet-based intranet and/or the Internet.

Figure 2A:
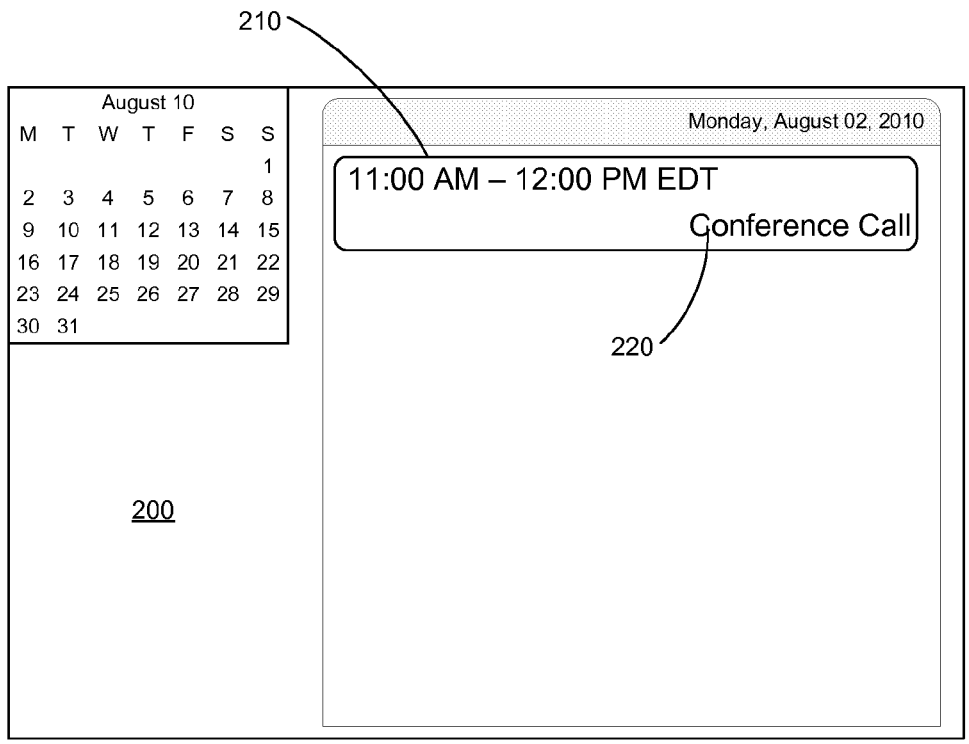
FIGS. 2A-2B is a block diagram of a calendar application interface.
Figure 2B:
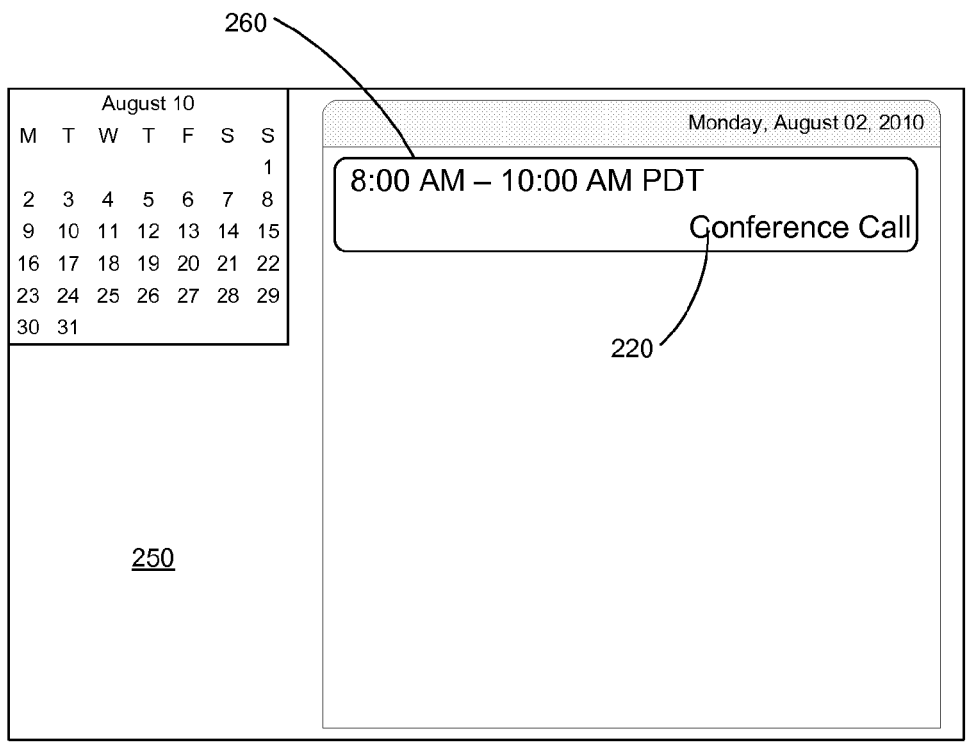

FIG. 2A is a block diagram of a first calendar application interface 200. First calendar application interface may display a local start time 210 for an event 220, and may be associated with a first user, such as a meeting organizer. FIG. 2B is a block diagram of a second calendar application interface 250 as may be associated with a second user. The first user and the second user may be located in different time zones, as illustrated by a second local start time 260 for event 220. For example, the first user may be located in the Eastern time zone while the second user may be located in the Pacific time zone. Consistent with embodiments of the invention, the respective local start times may be calculated according to a bias (e.g., an offset from Coordinated Universal Time (UTC)) associated with the local time zone.

Figure 3:
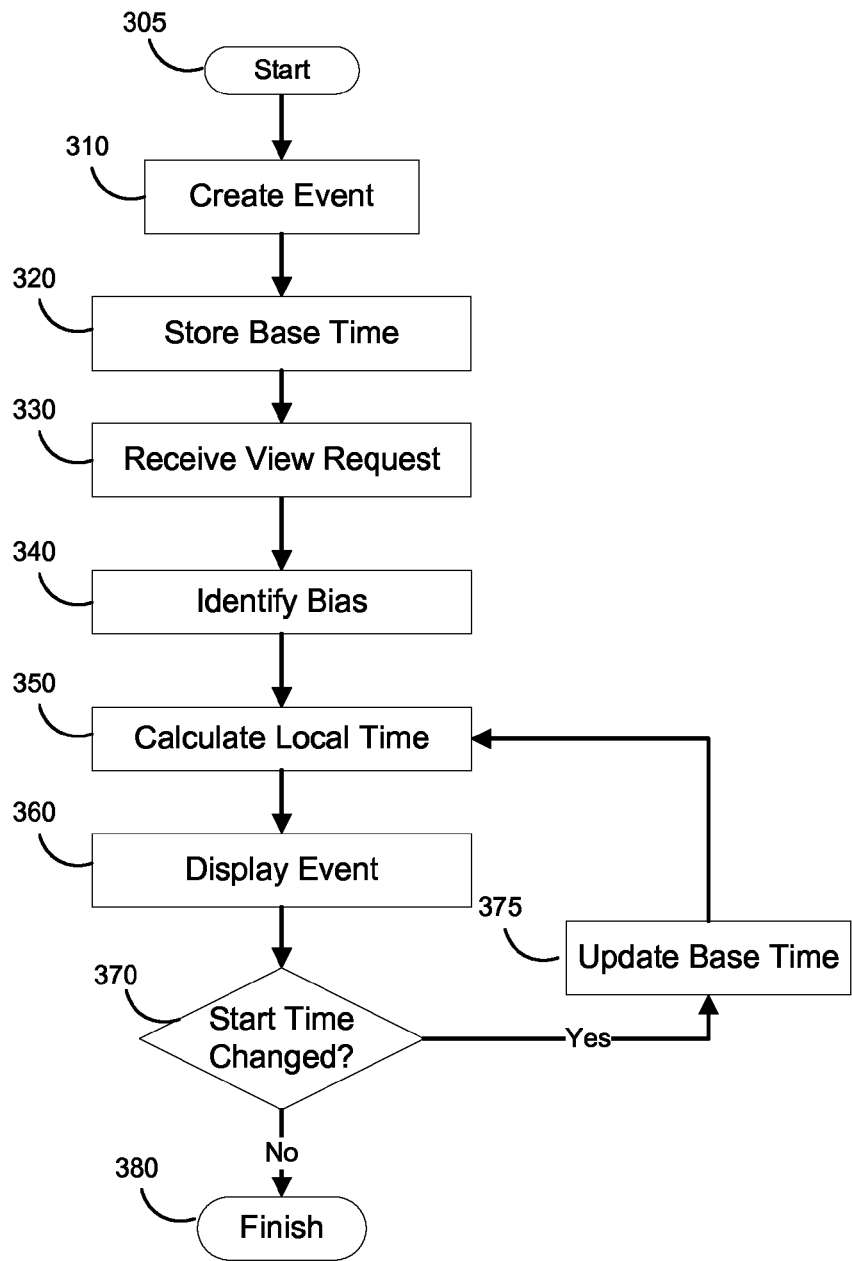
FIG. 3 is a flow chart of a method for providing dynamic rebasing of persisted time information.

FIG. 3 is a flow chart setting forth the general stages involved in a method 300 consistent with an embodiment of the invention for providing dynamic rebasing of persisted time information. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may create an event. For example, server 110 may receive a plurality of event characteristics (e.g., attendees, start time, subject, location, duration, etc) from an organizer of an event. The event may be created as an entry in event database 118 and may be accessible via electronic communication, such as over network 150.

From stage 310, method 300 may advance to stage 320 where computing device 400 may store a base time associated with the event. For example, a UTC and/or GMT time associated with the start time of the event may be calculated and associated with the entry in event database 118.

From stage 320, method 300 may advance to stage 330 where computing device 400 may receive a request to view the event. For example, a request may be received from user device 120(A) (e.g., via network 150) to retrieve the event for display on display device 125(A).

From stage 330, method 300 may advance to stage 340 where computing device 400 may identify a bias associated with the request. The bias may, for example, be associated with the user in a profile on user profile store 115. The bias may comprise an offset from UTC for the user's current time zone. For example, if the user is located in the Pacific time zone, the bias may comprise −7.

From stage 340, method 300 may advance to stage 350 where computing device 400 may calculate the local start time for the event. For example, if the event base time is 3 PM UTC and the bias for the Pacific time zone is −7, the local start time may be calculated as 3 PM−7 hours, or 8 AM local.

From stage 350, method 300 may advance to stage 360 where computing device 400 may display the event. For example, display device 125(A) may comprise a computer screen operative to display second calendar application interface 250, showing event 220 with second local start time 260.

From stage 360, method 300 may advance to stage 370 where computing device 400 may determine whether the start time of the event has been changed. For example, an event organizer may change the start time of the event from 8 AM Pacific to 9 AM Pacific. If so, method 300 may advance to stage 375 where computing device 400 may update the base time associated with the event to reflect the new start time, as described above with respect to stage 320, before returning to stage 350 to recalculate the local start time for re-display to any viewing users. Otherwise, method 300 may end at stage 380.

An embodiment consistent with the invention may comprise a system for providing dynamic time rebasing. The system may comprise a memory storage and a processing unit coupled to the memory storage. The processing unit may be operative to receive a request to process a scheduled event, such as a request to view a calendar item or to determine whether a task associated with the scheduled event should be executed. The processing unit may be further operative to retrieve a base time associated with the calendar item, identify a local bias associated with the request to view the calendar item, convert the base time to a local time according to the local bias, and display the local time and the calendar item. The base time may comprise, for example, Coordinated Universal Time (UTC) and/or Greenwich Mean Time (GMT). The task may comprise, for example, a maintenance task, such as an anti-virus scan and/or a processing task, such as invoice generation. The local bias may be associated with a user profile of a user requesting to view the calendar item. The processing unit may be operative to receive further requests to view the calendar item and recompute a local time for each requestor according to a bias associated with each. The further request may comprise, for example, subsequent requests from the same user associated with the same profile and using the same bias and/or requests from different users associated with the same and/or different biases.

The processing unit may be further operative to determine whether a daylight savings time change has occurred and, if so, determine whether the daylight savings time change is associated with the local bias associated with the user profile. The processing unit may then be operative to update the local bias associated with the user profile. The processing unit may be further operative to receive a change to a start time of the calendar item and update the base time according to the change to the start time. If the calendar event is currently displayed when the start time is changed, the processing unit may be operative to convert the updated base time to a new local time according to the local bias and re-display the calendar item at the recalculated start time.

Another embodiment consistent with the invention may comprise a system for providing dynamic time re-basing. The system may comprise a memory storage and a processing unit coupled to the memory storage. The processing unit may be operative to create a calendar event comprising a start time associated with a first time zone associated with a first user, identify a base time associated with the start time, store the base time and the calendar event in a database, receive a request to view the calendar event from the first user, calculate a local start time for the first user according to a first bias from the base time associated with the first time zone, and display the calendar event in a calendar view according to the local start time. The first user may comprise, for example, a meeting organizer and/or event creator while the second user may comprise an invited attendee of the event. The local start time may be recalculated each time a request to view the event is received according to a bias associated with the requestor. The bias associated with the requestor may, for example, be tied to a device associated with the requestor. For example, a user's profile may identify the user as being located in the Eastern time zone, but a request may be received via the user's mobile phone currently located in the Central time zone, such as when the user is traveling. The processing unit may be operative to identify a bias associated with the user's current location via the mobile phone and display the correctly calculated local start time of the event.

Yet another embodiment consistent with the invention may comprise a system for providing dynamic time rebasing. The system may comprise a memory storage and a processing unit coupled to the memory storage. The processing unit may be operative to receive a plurality of event properties from a user, create a calendar event associated with the plurality of event properties, establish a base time for the calendar event, wherein the base time comprises a Coordinated Universal Time (UTC) based time calculated according to a local bias associated with the user, receive a first request to view the calendar event from a first attendee of the event, identify a first bias associated with a first time zone associated with the first attendee, wherein the first bias comprises a first offset of the first time zone from UTC, calculate a first local start time according to the first bias, display the calendar event in a first calendar display at the calculated first local start time, receive a second request to view the calendar event from a second attendee of the event, identify a second bias associated with a second time zone associated with the second attendee, wherein the second bias comprises a second offset of the second time zone from UTC, calculate a second local start time according to the second bias, and display the calendar event in a second calendar display at the calculated second local start time.

Figure 4:
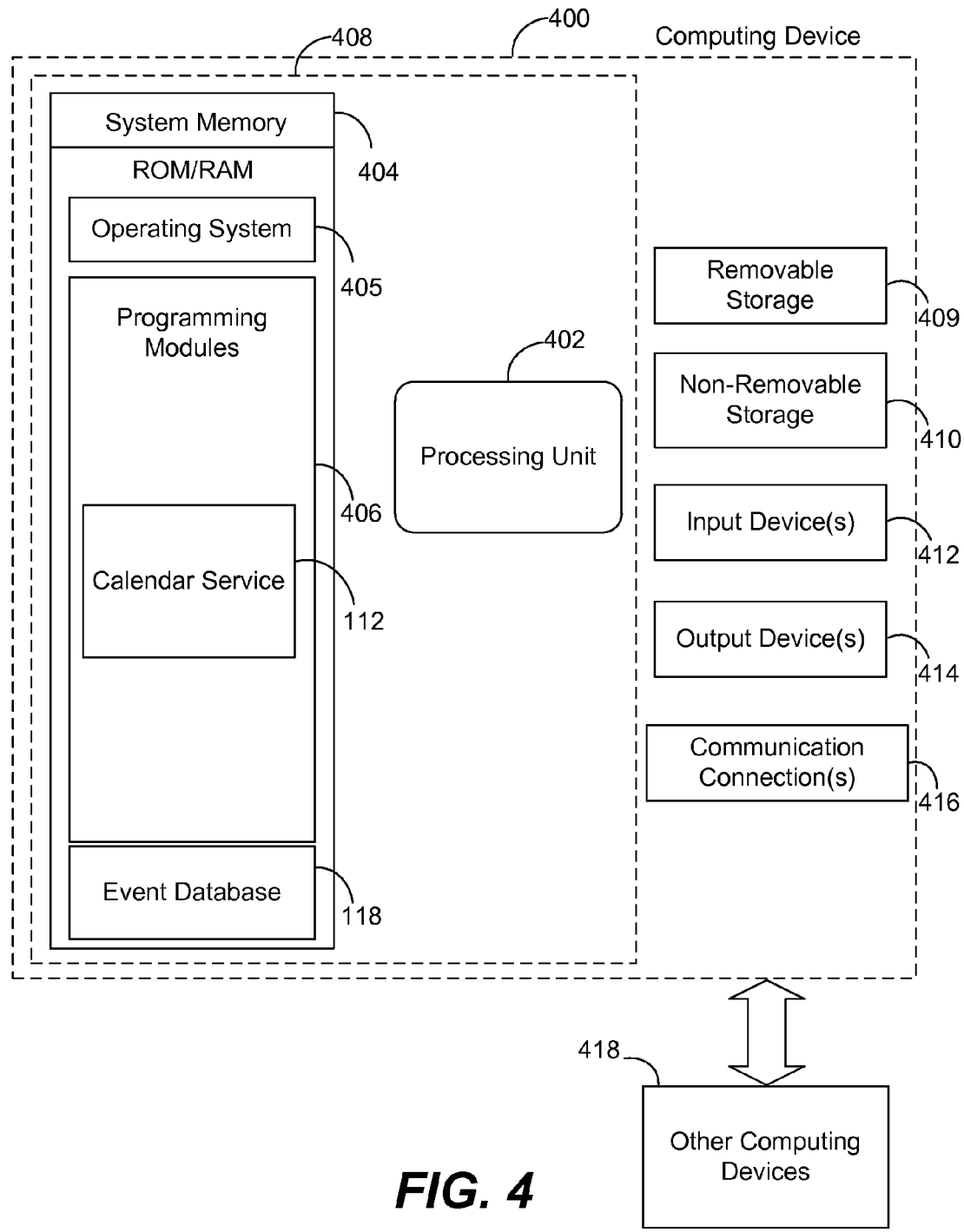
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include calendar service 112. Operating system 405, for example, may be suitable for controlling computing device 400's operation. In one embodiment, system memory 404 may include data storage such as event database 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., calendar service 112) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing dynamic time rebasing, the method comprising:
   receiving a request to process a scheduled event stored on a server, wherein processing the scheduled event comprises determining whether to execute one or more of a computing device maintenance task and a processing task associated with the scheduled event;
   retrieving a base time associated with the scheduled event;
   identifying a local bias associated with the request to process the scheduled event, the local bias associated with a user;
   converting the base time to a local time according to the local bias;
   communicating the scheduled event and the converted local time associated with the scheduled event to a device for display; and
   receiving a request to view a calendar item associated with the scheduled event from a different user associated with a different bias than the local bias.

2. The method of claim 1, further comprising displaying the calendar item according to the converted local time.

3. The method of claim 2, wherein the request comprises a user id associated with a user profile and wherein the local bias is associated with the user profile.

4. The method of claim 3, further comprising:
   determining whether a daylight savings time change has occurred;
   in response to determining that the daylight savings time change has occurred, determining whether the daylight savings time change is associated with the local bias associated with the user profile; and
   in response to determining that the daylight savings time change is associated with the local bias associated with the user profile, updating the local bias associated with the user profile.

5. The method of claim 2, further comprising:
   receiving a change to a start time of the calendar item; and
   updating the base time according to the change to the start time.

6. The method of claim 5, further comprising:
   determining whether the calendar item is currently displayed; and
   in response to determining that the calendar item is currently displayed:
   converting the updated base time to a new local time according to the local bias, and
   re-displaying the new local time and the calendar item.

7. The method of claim 1, further comprising:
   retrieving the base time associated with the calendar item;
   identifying the different bias associated with the request to view the calendar item;
   converting the base time to a second local time according to the different bias; and
   displaying the second local time and the calendar item.

8. A computer-readable storage medium which stores a set of instructions which when executed performs a method for providing dynamic time rebasing, the method executed by the set of instructions comprising:
   receiving a request to process a scheduled event stored on a server, wherein processing the scheduled event comprises determining whether to execute one or more of a computing device maintenance task and a processing task associated with the scheduled event;
   retrieving a base time associated with the scheduled event;

identifying a local bias associated with the request to process the scheduled event, the local bias associated with a user;
converting the base time to a local time according to the local bias;
communicating the scheduled event and the converted local time associated with the scheduled event to a device for display; and
receiving a request to view a calendar item associated with the scheduled event from a different user associated with a different bias than the local bias.

9. The computer-readable storage medium of claim 8, further comprising displaying the calendar item according to the converted local time.

10. The computer-readable storage medium of claim 9, wherein the request comprises a user id associated with a user profile and wherein the local bias is associated with the user profile.

11. The computer-readable storage medium of claim 8, further comprising:
retrieving the base time associated with the calendar item;
identifying the different local bias associated with the request to view the calendar item; and
converting the base time to a second local time according to the different bias.

12. A system for providing dynamic time rebasing, the system comprising:
a memory storage; and
a processing unit coupled to the memory storage, wherein the processing unit is operate to:
receive a request to process a scheduled event stored on a server, wherein processing the scheduled event comprises determining whether to execute one or more of a computing device maintenance task and a processing task associated with the scheduled event;
retrieve a base time associated with the scheduled event;
identify a local bias associated with the request to process the scheduled event, the local bias associated with a user;
convert the base time to a local time according to the local bias;
communicate the scheduled event and the converted local time associated with the scheduled event to a device for display; and
receive a request to view a calendar item associated with the scheduled event from a different user associated with a different bias than the local bias.

13. The system of claim 12, further comprising displaying the calendar item according to the converted local time.

14. The system of claim 13, wherein the request comprises a user id associated with a user profile and wherein the local bias is associated with the user profile.

* * * * *